United States Patent [19]

Murez

[11] 4,294,496

[45] Oct. 13, 1981

[54] PORTABLE COMPUTER ENCLOSURE

[75] Inventor: James D. Murez, Santa Monica, Calif.

[73] Assignee: GM Research, Carson, Calif.

[21] Appl. No.: 63,418

[22] Filed: Aug. 3, 1979

[51] Int. Cl.³ .................. A47B 21/00; A47R 81/00; H05K 5/00

[52] U.S. Cl. .................. 312/208; 312/280; 312/282; 312/294; 312/317 R; D14/106

[58] Field of Search .......... 312/208, 280–282, 312/290, 294, 314, 317; 179/186; D14/45, 47

[56] References Cited

U.S. PATENT DOCUMENTS

| | | | |
|---|---|---|---|
| D. 207,639 | 5/1967 | Walstrom | D26/5 |
| D. 222,472 | 10/1971 | Jacobson | D26/5 |
| D. 222,883 | 1/1972 | Lenow et al. | D26/5 |
| D. 224,112 | 7/1972 | Clement | D14/45 |
| D. 224,321 | 7/1972 | Williams, Jr. | D26/5 |
| 3,393,950 | 7/1968 | Dutcher et al. | 312/317 |
| 4,168,870 | 9/1979 | Hill | 312/294 |

OTHER PUBLICATIONS

Envoy, Datamation, Mar. 1975, p. 39, 1 sheet of publication including 1 FIG.
Saber's Crypto Mark TV, Bus. Comm.

*Primary Examiner*—Victor N. Sakran
*Attorney, Agent, or Firm*—Lewis B. Sternfels

[57] ABSTRACT

A single enclosure (10), which satisfies the needs of portability, is closeable into a suitcase-type cabinet with a tractable carrying handle. Specifically, a keyboard enclosure (14) is hinged (16) to a main frame enclosure (12) in such a manner that it is possible to fold the keyboard up against the main frame and to latch (40) the two together.

4 Claims, 7 Drawing Figures

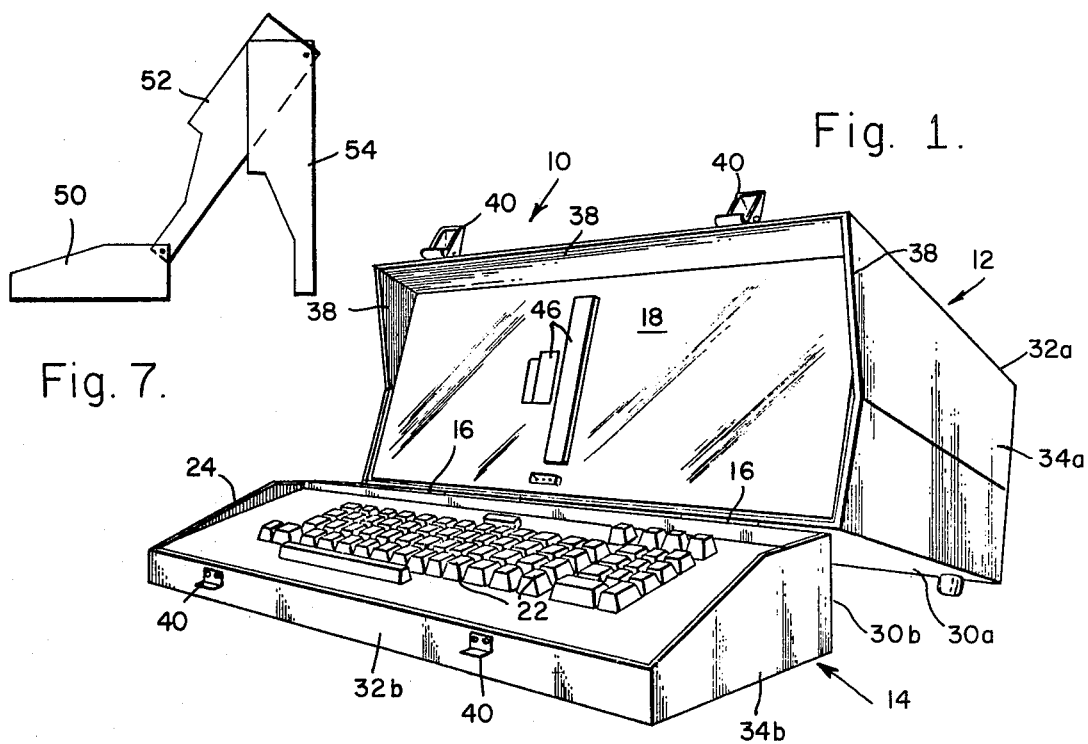
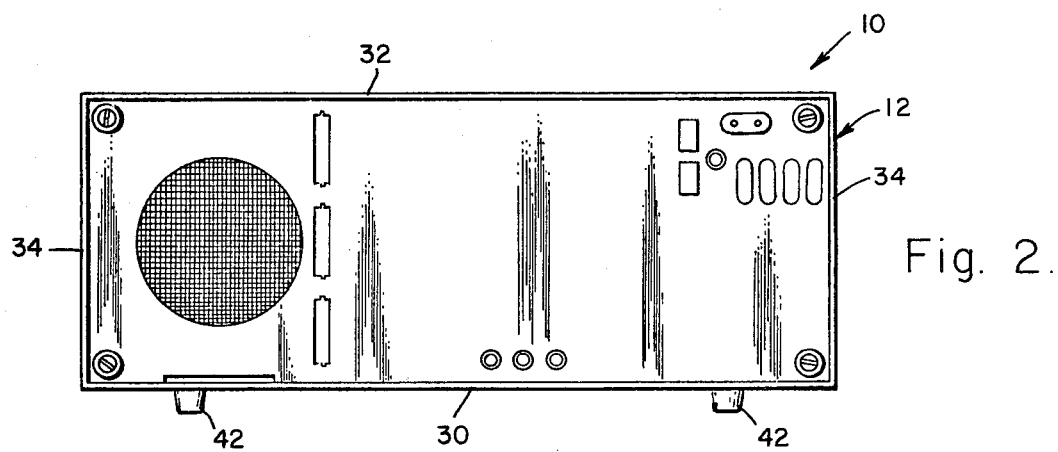
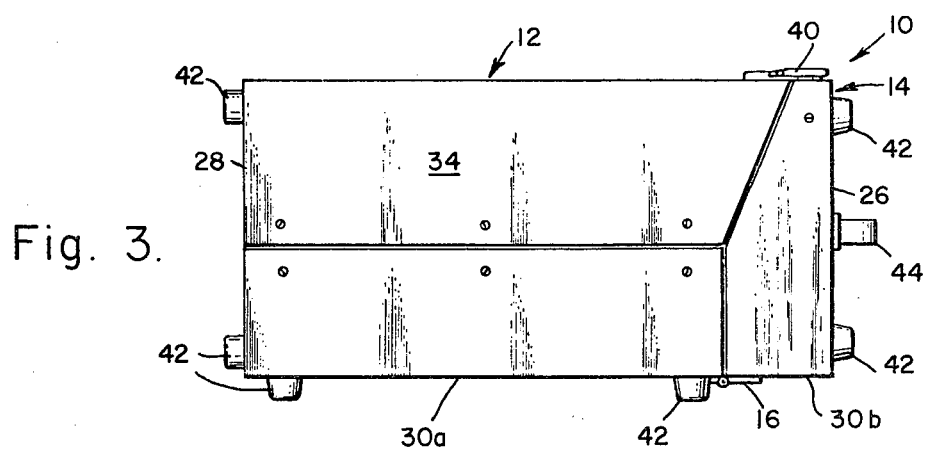

PORTABLE COMPUTER ENCLOSURE

The present invention relates to an enclosure for a computer, and in particular, one which enables the computer to be easily transported.

CROSS-REFERENCE TO RELATED APPLICATIONS

The design of the present invention is disclosed in copending patent application Ser. No. 47,061, filed June 11, 1979.

Background Art

There have been many computers or communication terminals which have been packaged for tabletop use and/or to be portable, such as set forth in the following design patents, Nos. 207,639; 222,472; 222,883; and 224,321. A further computer is disclosed in a publication entitled "Saber's Crypto Mark IV for Business Communications." Only those illustrated in patents 222,883 and 222,472 and in the Saber publication disclose a portable enclosure; however all relate to a suitcase or typewriter-type package. While, perhaps, suitable for enabling one to carry the computer, their design does not permit what is deemed to be the most efficient use of the enclosure, consonant with opening the computer and using it.

SUMMARY OF THE INVENTION

The present invention permits use of a single enclosure which satisfies the needs of portability as it is closeable into a suitcase-style cabinet with a tractable carrying handle. Specifically, the keyboard enclosure is hinged to the main frame enclosure in such a manner that it is possible to fold keyboard up against the main frame and to latch the two together.

It is, therefore, an object of the present invention to provide for a computer housed in a closeable, suitcase-style cabinet.

Another object is to provide for such an enclosure which is easily deployable into operation.

Other aims and objects as well as a more complete understanding of the present invention will appear from the following explanation of exemplary embodiments and accompanying drawings thereof.

BRIEF DESCRIPTION OF THE DRAWINGS

FIG. 1 is a perspective view of a portable computer enclosure in its open and operable condition;

FIG. 2 is a rear view thereof in its closed and portable condition;

FIG. 3 is a side view thereof in its closed and portable condition;

FIG. 7 is a side view of another embodiment of the present invention in its open position.

DETAILED DESCRIPTION OF THE INVENTION

Figure 4:
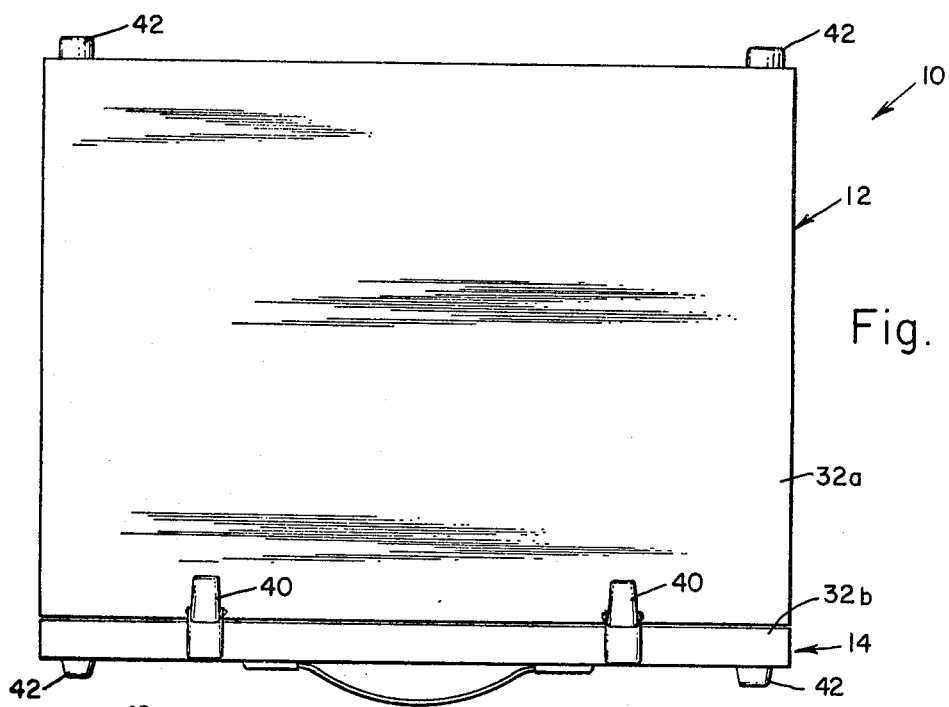
FIG. 4 is a top view thereof in its closed and portable condition.
Figure 5:
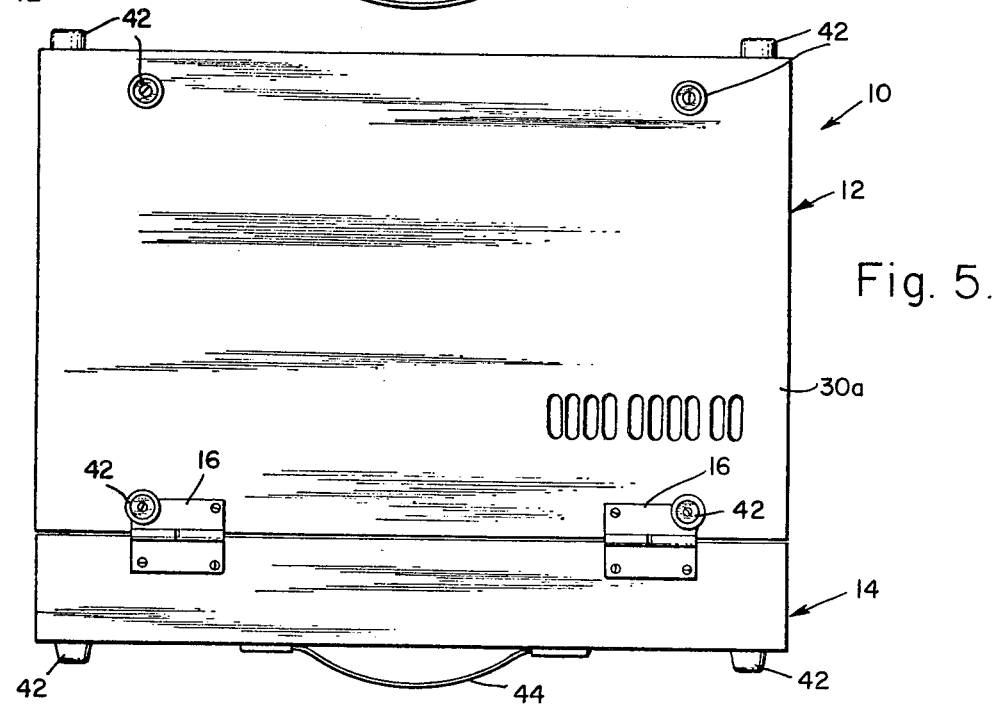
FIG. 5 is a bottom view thereof in its closed and portable condition.
Figure 6:
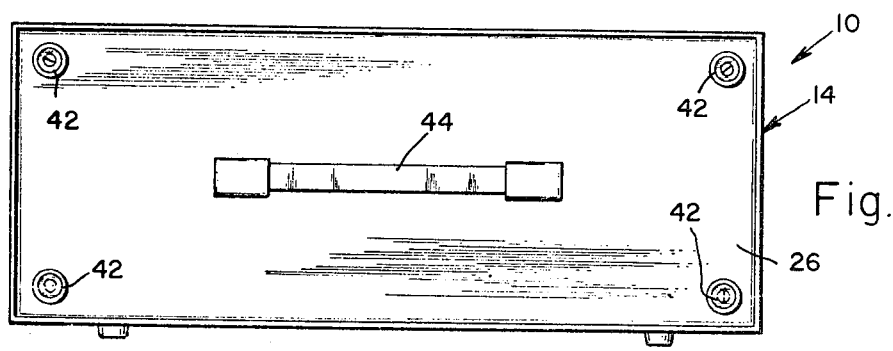
FIG. 6 is a front view thereof in its closed and portable condition.

Accordingly, with reference to FIGS. 1-6, a portable computer enclosure 10 comprises first and second enclosures 12 and 14 which are hinged at 16 to define a single suitcase-style cabinet. The first enclosure comprises a main frame having a display 18 at its closeable end 20. The second enclosure includes a keyboard 22 at its closeable end 24. Both the main frame and the keyboard are of conventional construction and computer design.

In its preferred configuration, portable computer 10 has a general rectangular parallelepiped configuration, although it is to be understood that other configurations may be used if desired. As shown, the computer enclosure includes a front panel 26 backing keyboard 22, a rear panel 28 backing the main frame, a segmented bottom panel 30, a segmented top panel 32, and segmented side panels 34. The segmented bottom panel comprises first and second portions 30a and 30b respectively on first and second enclosures 12 and 14. Segmented top panel 32 comprises first and second portions 32a and 32b respectively on the first and second enclosures. In a like manner, each of segmented side panels 34 comprises first portions 34a and 34b respectively on their first and second enclosures.

In order to provide shielding for display 18 from light ambient thereto, extensions 38 of the top and side panels of first enclosure 12 extend beyond the display to form a hood. Second enclosure 14 has its top and side panels similarly configured to engage with extending portions 38 so that, when enclosure 14 with its keyboard 22 is closed upon closure 12 and its display 18, about hinges 16, the two interfit neatly.

Latches 40 respectively on each of the segmented top panels interengage to secure the two enclosures together in its portable condition.

To enable the entire portable computer to be stood on its end or to be opened into its operable condition, foot pads 42 are placed on and extended from rear panel 28, bottom panel segment 30a, and front panel 26. In addition, a carrying handle 44 also extends from front panel 26 to enable the computer to be carried.

Suitable openings 46 for reception of suitable disc drives are provided through the covering over display 18.

FIG. 7 depicts a modification of the present invention which is useful, for example, when a very flat screen display, such as a plasma screen, is utilized. In this embodiment, a keyboard 50 is hinged to a main frame 52 and a pair of support arms 54 are pivotally secured on either side to main frame 52 for support thereof when the enclosure is opened.

Although the invention has been described with reference to particular embodiments thereof, it should be realized that various changes and modifications may be made therein without departing from the spirit and scope of the invention.

I claim:

1. A portable computer including:

first and second enclosures hinged together at ends which are closeable upon each other to define a single suitcase-type cabinet having a general rectangular parallelepiped configuration;

said first enclosure comprising a main frame with a display at its closeable end, and a rear panel backing said main frame;

said second enclosure having a keyboard at its closeable end, a front panel backing said keyboard, and a handle extending from said front panel;

said enclosures further having top and bottom panels respectively segmented into first and second portions respectively on said first and second enclosures;

hinges connecting said first and second portions of said segmented bottom panel;

cooperating latches respectively on said first and second portions of said segmented top panel for securing said enclosures together when closed; and foot pads extending from said rear panel, said first portion and said front panel.

2. A portable computer according to claim 1 wherein said first enclosure includes a hood extending beyond and shielding said display from light ambient thereto.

3. A portable computer according to claim 2 wherein said second enclosure includes a surrounding panel structure which is configured to engage with said hood upon closure of said enclosures.

4. A portable computer according to claim 1 wherein said enclosures further include a pair of side panels, each segmented into first and second portions respectively on said first and second enclosures, said top panel first portion and at least parts of said side panel first portions extending beyond and shielding said display from light ambient thereto.

* * * * *